United States Patent Office.

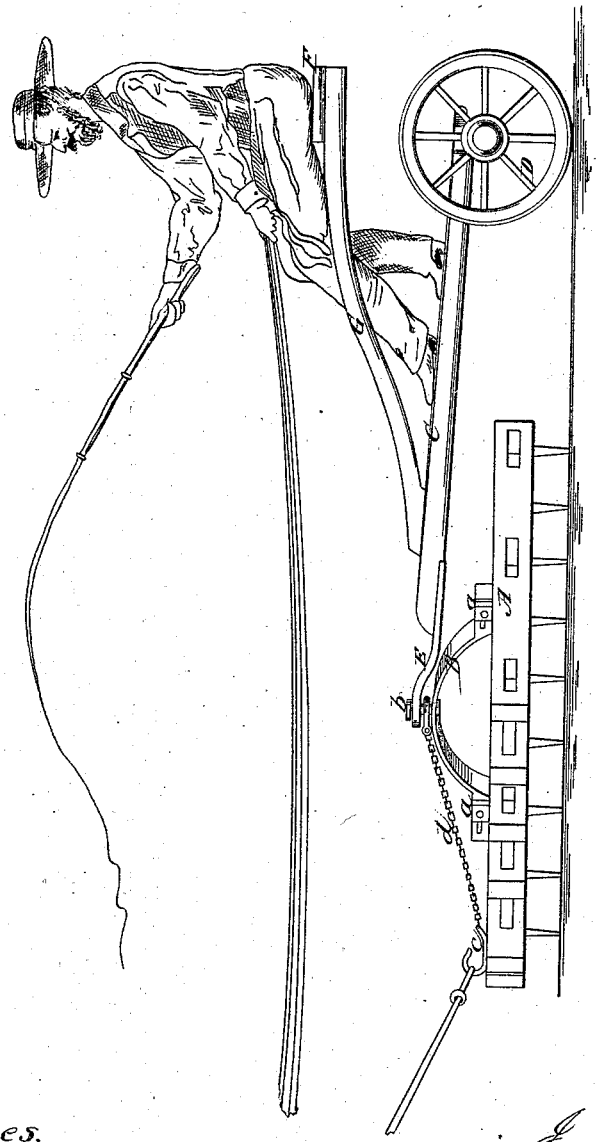

JAMES M. FREEMAN, OF BELLEVILLE, NEW YORK.

Letters Patent No. 68,179, dated August 27, 1867.

IMPROVEMENT IN RIDING ATTACHMENT FOR HARROWS.

The Schedule referred to in these Letters Patent and making part of the same.

TO ALL WHOM IT MAY CONCERN:

Be it known that I, JAMES M. FREEMAN, of Belleville, in the county of Jefferson, and State of New York, have invented a new and improved Riding Attachment for Harrows; and that the following description, taken in connection with the accompanying drawing, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

This invention relates to a new and improved riding attachment for harrows, whereby the driver, instead of walking behind or by the side of the harrow, as hitherto, may ride on a convenient seat, and have much better control over the team and implement than hitherto.

The accompanying drawing represents a side view of my invention.

A represents a harrow, which may be constructed of two parts connected together by hinges, that being the most approved form, although others may be used. B represents an elastic bar of steel or iron, said bar being curved in semicircular or an approximate form, and having its ends attached to the harrow by slip-hinges or joints, a, which will admit of the two parts of the harrow rising and falling to conform to the inequalities of the ground over which it may pass. In the centre of the elastic bar B there is fitted a bolt, b, to which and a draught-hook, c, at the front end of the harrow, a chain, d, is attached. C is a light frame, which may be of triangular or other suitable form, and has its rear part supported by wheels D, the front part having a metal bar, E, attached to it, which is fitted on the bolt b, the latter connecting the frame C to the bar B and harrow A.

F is a driver's seat attached to inclined wooden bars G, secured to frame C, said bars being elastic to admit of the seat having a requisite degree of elasticity.

It will be seen from the above description that the harrow is relieved from all strain or pull of the draught, and is allowed to work equally as free as if the riding attachment were not connected or applied to it, as the pull or draught is transmitted by the chain d from the hook c to the bolt b, to which the frame C is attached, while the elastic bar B greatly relieves the harrow in its operation in passing over uneven ground, and the frame keeps the harrow down to its work.

Having thus described my invention, I claim as new, and desire to secure by Letters Patent—

The connecting of a riding attachment to a harrow, through the medium of the elastic bar B, bolt b, chain d, and draught-hook c, all arranged substantially in the manner as and for the purpose specified.

JAMES M. FREEMAN.

Witnesses:
   J. L. HUNTING,
   E. T. LITTLEFIELD.